United States Patent [19]

Morokawa

[11] Patent Number: 4,630,122

[45] Date of Patent: Dec. 16, 1986

[54] TELEVISION RECEIVER WITH LIQUID CRYSTAL MATRIX DISPLAY PANEL

[75] Inventor: Shigeru Morokawa, Tokorozawa, Japan

[73] Assignee: Citizen Watch Co., Ltd., Tokyo, Japan

[21] Appl. No.: 592,172

[22] Filed: Mar. 22, 1984

[30] Foreign Application Priority Data

Mar. 26, 1983 [JP] Japan ................... 58-051327

[51] Int. Cl.$^4$ .................. H04N 5/70; H04N 3/14
[52] U.S. Cl. ...................................... 358/241; 340/784
[58] Field of Search .............. 358/241, 236; 340/784

[56] References Cited

U.S. PATENT DOCUMENTS

| | | | |
|---|---|---|---|
| 3,976,362 | 8/1976 | Kawakami | 350/160 LC |
| 4,370,647 | 1/1983 | Brantingham | 340/784 |
| 4,393,405 | 7/1983 | Ikeda | 358/153 |
| 4,447,131 | 5/1984 | Soma | 340/784 X |
| 4,462,027 | 7/1984 | Lloyd | 340/784 |
| 4,481,511 | 11/1984 | Hanmura et al. | 340/765 X |
| 4,511,926 | 4/1985 | Crossland et al. | 358/236 |

FOREIGN PATENT DOCUMENTS

54-48433  4/1979  Japan ................... 358/236

Primary Examiner—Michael A. Masinick
Assistant Examiner—E. Anne Toth
Attorney, Agent, or Firm—Jordan and Hamburg

[57] ABSTRACT

A television receiver is equipped with a liquid crystal matrix display panel having the drive electrodes arranged such as to form a plurality of regions, with the regions each successively entering a drive phase of operation in which selection and bias drive signals are applied to the display element electrodes and a rest phase of operation in which a voltage level substantially equal to zero is applied between the display element electrodes, with only one region operating in the drive phase at a time and the remaining regions operating in the rest phase. The display contrast attainable with a given number of rows of picture elements in the display can thereby be substantially increased, e.g. can be effectively doubled for the case of a display divided into two regions, without the need to utilize large-capacity video memory circuits.

22 Claims, 11 Drawing Figures

TELEVISION RECEIVER WITH LIQUID CRYSTAL MATRIX DISPLAY PANEL

BACKGROUND OF THE INVENTION

The present invention relates to a television receiver which utilizes a liquid crystal matrix display panel, and in particular to such a television receiver whereby a larger number of elements can be driven with a satisfactory level of display contrast than has been possible in the prior art, without the need for utilizing large-capacity memory circuit means.

Liquid crystal display panels are used in various electronic devices, such as calculators, timepieces, etc, where only a relatively small amount of data need be displayed, and in which they provide the advantages of extremely thin shape together with a very low degree of power consumption. In order to provide a relatively large size of display, comparable to that attainable by utilizing a cathode ray tube display, a matrix arrangement of the liquid crystal display elements is employed, i.e. with a set of horizontally aligned and a set of vertically aligned drive electrode lines disposed on opposite faces of the display panel, defining display elements at the intersections of these electrode lines. However, a limit to the number of display elements of such a liquid crystal matrix display panel is set by the fact that the display contrast drops to an unacceptable level, if the number of display elements increases above a certain value. More specifically, in the case of a liquid crystal matrix display panel in which lines of display elements, e.g. horizontally aligned rows of display elements, are successively addressed by scanning signals, satisfactory display contrast together with a sufficiently wide viewing angle cannot be obtained if the number of rows of display elements is increased above approximately 50 to 60. This limitation is a result of cross-talk effects occurring between the electrodes, and is set by the physical characteristics of the liquid crystal material together with the drive signal waveforms which must be employed.

In the case of a liquid crystal matrix display panel television display having a picture size comparable to that of a conventional CRT display, it is necessary to provide approximately 500×700 picture elements, to obtain sufficient display resolution. With a very small size of display screen, used in a miniature television receiver, the number of display elements can be reduced. However even in this case, it is necessary to provide an array of at least 120×160 picture elements. Thus, using a simple conventional line-by-line scanning system for a liquid crystal matrix display panel, it has not been possible to provide a display having a sufficiently large number of display elements for use in a television receiver. Various ways of overcoming this problem have been proposed, to enable the number of rows of picture elements which can be driven to be increased. In one such method, as described in detail hereinafter, multiplex drive is utilized. Specifically, each horizontally aligned timing electrode of the matrix, to which periodically generated timing signals are applied to scan the rows of picture elements, is arranged to drive two or more rows of picture elements by time-division operation. This enables the number of rows of picture elements which can be driven with a satisfactory level of display contrast to be substantially increased, i.e. the level of display contrast can be made approximately equal to that obtainable with a simple sequential scanning drive method in which one-half the number of rows of display elements are used. For example, it is possible to provide such a liquid crystal matrix display panel having a total of 60 horizontally aligned timing electrodes, each of which drives two lines of picture elements, with 320 vertically aligned segment electrodes. Such a multiplex display panel will provide the same number of display elements as a simple, i.e. non-multiplexing type of matrix display panel, having 160 segment electrodes and 120 timing electrodes. However with the multiplex display panel, a total of (60+320)=380 connecting leads are required coupled between the drive electrodes and the peripheral circuits which generate the drive signals. In the case of the simple, non-multiplex drive method driving the same number of display elements, only (120+160)+280 connecting leads are required between the drive electrodes and the peripheral circuits. Thus a substantially greater number of connecting leads between the display panel and the drive circuits are required, and in addition a greater number of output terminals must of course be provided on the integrated circuits forming these drive circuits.

In addition, such a multiplexing method has the disadvantage that it becomes necessary to introduce connecting lead portions between the vertically aligned drive electrodes, leading to greater difficulty in arranging the electrode pattern configuration, and so to significantly increased manufacturing cost. In addition, a substantial amount of display area is occupied by these connecting lead portions, reducing the aperture ratio of the display panel and so acting to reduce the display contrast and so to some extent defeating the intended objective.

The multiplex drive method has the further disadvantage that cross-talk can occur between the connecting lead portions disposed between the drive electrodes on the display panel, thereby tending to further reduce display contrast.

For these reasons, it is not practical to implement multiplexing by a factor of more than two, i.e. with each timing electrode driving two rows of picture elements, so that it is not possible to provide a sufficient number of display elements for television display purposes using the multiplexing drive method alone.

With another method which has been proposed in the prior art, the display is divided into two regions, i.e. an upper and a lower region, which are driven separately. Incoming video signal data is stored in a large-capacity memory circuit, i.e. having sufficient capacity to store image data for the entire display screen. After being stored, image data for the top half of the display and that for the lower half is read out from the memory circuit simultaneously, while scanning signals are applied to select the rows of display elements of the upper and lower display regions in synchronism. In this way, each half of the display is scanned twice in succession during each vertical scanning interval of the television broadcast signal, so that the effective level of display contrast attained is equivalent to that of a liquid crystal matrix display panel utilizing a simple sequential scanning drive method but having one-half the number of rows of picture elements.

This prior art method has the great disadvantage that the memory circuit required must have a very large storage capacity and in addition must operate at very high write and read speeds, so that the cost of this memory circuit will substantially increase the overall manufacturing cost of the television receiver.

There is therefore a requirement for drive means to be employed in a television receiver having a liquid crystal matrix display panel whereby a sufficiently large number of rows of display elements can be provided for acceptable picture resolution together with a sufficiently high degree of display contrast, and whereby the disadvantages of the prior art drive methods described above can be eliminated, so that such a television receiver can be manufactured at lower cost than has been possible hitherto.

SUMMARY OF THE INVENTION

A television receiver having a liquid crystal matrix display panel according to the present invention utilizes a display panel having an array of display elements which are effectively divided into a plurality of regions, with respect to the electrodes which apply drive signals to these display elements. For example, the display panel may be divided into two regions, comprising the upper half and lower half of the display respectively, with the upper half of the display panel being driven by a first set of horizontally aligned timing electrodes to which periodically repeated timing signal pulses are applied to successively scan the rows of display elements and a first set of vertically aligned segment electrodes to which segment drive signals representing video data for the upper half of the display are applied, (i.e. with the timing electrodes and segment electrodes being formed on opposite faces of the liquid crystal display panel and with the display elements being defined by portions of the liquid crystal material sandwiched between intersections of the timing electrodes and segment electrodes) and a second set of timing electrodes for driving the lower half of the display together with a second set of segment electrodes to which segment drive signals representing video data for the lower half of the display are applied. Each region of the display alternately operates in a drive phase, in which the rows of display elements of that region are successively addressed by the timing signal pulses, and a resting phase in which a potential substantially equal to zero is applied between the timing electrodes and segment electrodes of the display elements in that region. While one region is operating in the drive phase, all of the other regions of the display operate in the rest phase. In this way, no induced cross-talk voltages can be applied to the display elements in each region operating in the rest phase, the display contrasts, is considerably increased by comparison with a simple type of sequentially driven liquid crystal matrix display panel, i.e. a panel in which division into separate regions is not utilized. More specifically, if the display panel is divided into two regions as described above, then the display contrast attainable is almost equivalent to that of a liquid crystal matrix display panel utilizing a simple sequential row-scanning drive method having one-half the number of rows of display elements. That is to say, with a display panel according to the present invention, the number of rows of display elements which can be driven while providing satisfactory display contrast is effectively doubled, if the display is divided into two regions as described above.

This is achievable without the disadvantages of cost and complexity associated with the prior methods of increasing the number of rows of picture elements which can be driven, as described hereinabove, and so can make practical the manufacture of such a television receiver equipped with a liquid crystal matrix display panel.

DESCRIPTION OF THE PREFERRED EMBODIMENTS

Television broadcast signals are transmitted in time-division form, with video data for each picture element of the image to be displayed being transmitted in a sequential point-by-point manner. Such a video signal can be utilized directly to drive a cathode ray tube display, since sufficient brightness can be imparted to each display element by the scanning beam, in spite of the low duty ratio for which each display element is driven. However in the case of a liquid crystal matrix display panel used in a television receiver, such point-by-point driving of the display elements is not practical. Instead, video data for each row of picture elements is assembled, one row at a time, by circuit means such as a shift register, stored temporarily in a memory circuit, then applied as a set of drive signals in parallel onto the drive electrodes of the matrix. That is to say, the liquid crystal matrix display panel is driven on a line-by-line basis, rather than on a point-by-point basis. In this way, the duty ratio for which each display element is driven is maximized.

Generally speaking, the minimum number of rows of display elements necessary for a television display of small size is of the order of 125. Using a simple prior art type of sequential line-by-line drive method, each display element is driven during a time interval (referred to in the following as the selection phase) which is approximately 1/125 of the duration of a complete vertical scanning period. During the remaining 124/125 of the vertical scanning period, referred to in the following as the bias phase, an AC bias voltage (i.e. having an average value of zero) is applied to the display element. As the number of rows of picture elements is increased, with such a prior art drive method, the relative duration of the bias phase increases. With such a liquid crystal matrix display panel, timing signal pulses applied to the horizontally aligned timing electrodes of the display panel are generated as a fixed function of time, i.e. on a periodically repetitive basis to successively scan the timing electrodes from top to bottom. Signals representing the display data, referred to in the following as segment drive signals, are applied to the vertically aligned segment electrodes. If the peak value of the timing signal pulses is designated as a, and peak value of the segment electrode drive voltage is assumed to be 1, then the voltage difference appearing across a liquid crystal display element resulting from these drive electrode voltages is equal to (a−1), during the selection drive phase. During the bias phase, only the bias voltage of ±1 is applied to the display element.

The ratio of the ON voltage Von of a liquid crystal display element (i.e. the applied voltage for which the display element is set in the fully ON state of maximum reflectance of incident light) to the OFF voltage Voff (i.e. the applied voltage for which the liquid crystal display element is set in the fully OFF state of minimum reflectance of incident light) is related to the number of rows n of the liquid crystal matrix display panel as follows:

$$V_{on}(n,a) = \sqrt{((a+1)^2 \cdot 1 + (n-1) \cdot 1^2)/n} \cdot V_o$$

$$V_{off}(n,a) = \sqrt{((a-1)^2 \cdot 1 + (n-1) \cdot 1^2)/n} \cdot V_o$$

where $V_O$ is the applied voltage level which sets an element in the fully ON state.

It can be derived from the above equations that the ratio $V_{on}/V_{off}$ has a maximum value, with the optimum value of voltage being selected, as follows:

$$V_{on}/V_{off}(max) = \sqrt{(\sqrt{n}+1)/(\sqrt{n}-1)}$$

Thus for the case of a display having 121 rows, the corresponding maximum value of $V_{on}/V_{off}$ is given as 12/10, i.e. approximately equal to 1.1.

If phase modulation is used to vary the brightness level of each display element, i.e. if the drive voltage applied to a display element is made equal to a during a portion p of the selection phase, and is made equal to −a during the remaining portion (1 −p) of the selection phase, then the corresponding ratio of $V_{on}/V_{off}$ is given as:

$$(n, a, p) = \sqrt{((a+1)^2 \cdot p + (a-1) \cdot (1-p) + n - 1/((a-1)^2 + n - 1)}$$

It can be understood from the above that the ratio of $V_{on}/V_{off}$ of a liquid crystal matrix display panel, and hence the level of display contrast, is essentially determined by the number of rows of display elements in the display panel which are sequentially driven. With the present invention, as described hereinafter, the display is divided into a plurality of regions, such that only one region is driven by the timing signal pulses and segment drive signals at one time, with the other regions operating in a mode of operation referred to as the rest phase, whereby a voltage of close to zero is applied between the timing electrodes and segment electrodes of each display element. In this way, the effective number of rows of display elements of the display matrix, with respect to the maximum value of $V_{on}/V_{off}$ as derived above, is substantially reduced, so that the display contrast is increased. This rest phase concept will be made clearer by the following description of an embodiment of a television receiver equipped with a liquid crystal matrix display panel according to the present invention.

Figure 1:
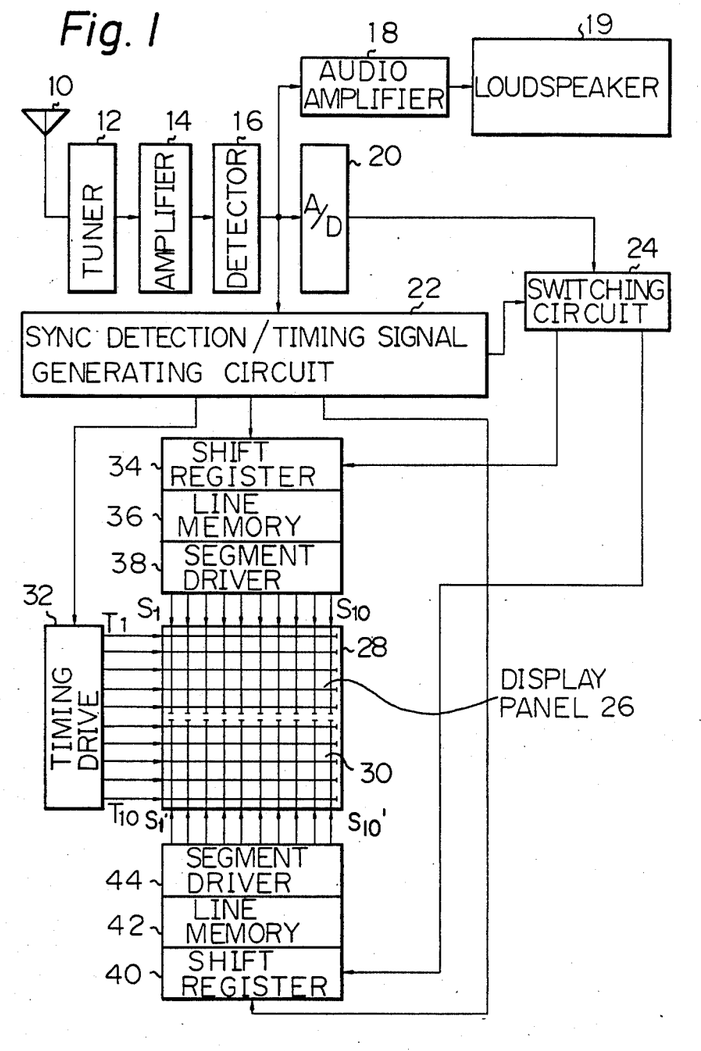
FIG. 1 is a general block circuit diagram of an embodiment of a television receiver incorporating a liquid crystal matrix display panel according to the present invention.

This embodiment is shown in general block circuit diagram form in FIG. 1. Numeral 10 denotes an antenna, which supplies RF signals to a tuner 12. Output signals from tuner 12 are supplied to an IF amplifier 14 and hence to a detector 16. The detected output signals are applied through an audio amplifier 18 to a loudspeaker 19, while the video signal component is applied to an analog-digital converter circuit 20 and to a sync detector/timing control signal generating circuit 22. The A-D converter circuit 20 serves to convert the video data corresponding to each picture element of the image to be displayed into digital code form, and this encoded data is input to a switching circuit 24. The sync detector/timing control signal generating circuit 22 serves to separate the horizontal and vertical sync pulse components of the video signal, and uses these to produce various timing control signals necessary for operation of the liquid crystal matrix display panel. Numeral 26 denotes the liquid crystal matrix display panel, which is divided as shown into two regions, i.e. an upper region 28 and a lower region 30. In this embodiment, liquid crystal matrix display panel 26 has a total of 100 display elements, with each of upper region 28 and lower region 30 having 50 display elements.

The timing electrodes of upper region 28 shown as horizontally aligned electrodes, are driven by timing signal pulses T1 to T5 produced from a timing drive circuit 32, while the timing electrodes of lower region 30 are driven by timing signal pulses T6 to T10 from timing drive circuit 32, these timing signal pulses being produced as a fixed function of time as described hereinafter. Numeral 34 denotes a shift register, coupled to receive digitally encoded data from switching circuit 24, and assembles this sequential point-by-point image data into image data for a complete row of display elements. This assembled data is then stored in a line memory circuit 36, comprising for example a set of latch circuits. A segment drive circuit 38 produces segment drive signals which are phase-modulated such as to control the brightness of each display element in accordance with the image data stored in line memory circuit 36. The output segment drive signals from segment drive circuit 38, designated as S1 to S10, drive the segment electrodes of the upper half 28 of liquid crystal matrix display panel 26, which are isolated from the segment electrodes of the lower region 30 of the display panel.

Similarly, a shift register 40 receives image data in digitally encoded form for the display elements of lower region 30, from switching circuit 24, and the resultant assembled image data for each line of display elements is stored in a line memory circuit 42, with phase-modulated segment drive signals being produced in response from a segment drive circuit 44. These segment drive signals, designated as S1' to S10', are applied to the segment electrodes of the lower region 30 of liquid crystal matrix display panel 26.

Switching circuit 24 is controlled by timing control signals from sync detector/timing control signal generating circuit 22 such as to apply image data for the upper 5 lines of display elements of display panel 26, transmitted in sequential point-by-point manner and encoded by A-D converter 20, to shift register 34 during the appropriate time interval, and to similarly supply image data for the lower 5 lines of display elements of display panel 26 to shift register 40 during a succeeding time interval.

Figure 2:
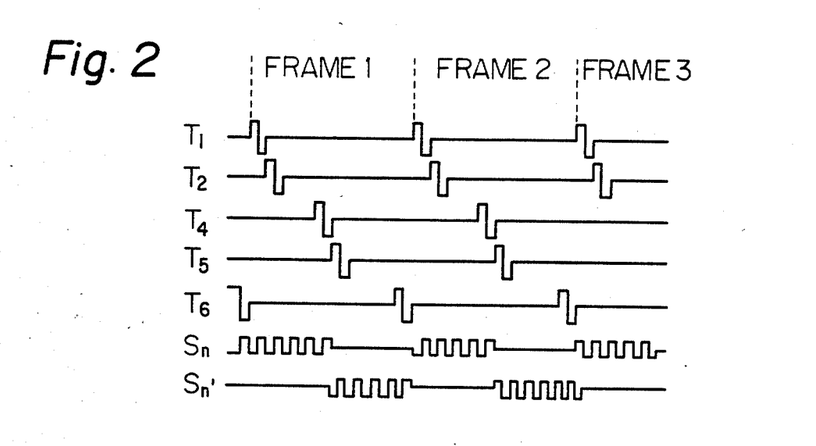
FIG. 2 is a timing chart for illustrating the operation of the embodiment of FIG. 1.

The operation of the embodiment of FIG. 1 will be described with reference to the timing chart of FIG. 2, in which the timing signal pulse and segment drive signal waveforms are illustrated for two successive video frame intervals (i.e. vertical scanning intervals) of the television display. At the start of frame 1, the first row of display elements is selected by timing signal pulse T1, which is of bipolar form as required for operation of a liquid crystal display panel, while at the same time as a result of the encoded image data previously transferred by switching circuit 24 and stored in line memory circuit 36, corresponding segment drive signals S1 to S10, indicated as Sn in FIG. 2, are output in parallel onto the segment electrodes of the upper region 28 of display panel 26. These segment drive signals are phase modulated such that, for example a display element of the first row, selected by timing signal pulse T1 and driven by a segment drive signal waveform of the form indicated as Sn, would be driven to the fully ON state, since the segment drive signal and timing signal pulse waveforms differ in phase by 180°.

If these drive signal waveforms were phase sifted by 180°, then the display element would be set in the fully OFF, i.e. dark state. Intermediate grey-scale values of display element brightness are obtained for intermediate degrees of phase difference between the timing signal pulse and segment drive signal waveforms, with the degree of phase shift applied to each segment drive signal waveform being determined by the corresponding value of encoded video data held in line memory circuit 36.

In this way, voltages are applied which are of fixed amplitude but variable pulse width, to each display element of the first row during timing signal pulse T1. Upon completion of this selection phase of the first row, timing signal pulse T2 is generated to address the second row of display elements, while corresponding phase-modulated segment drive signals S1 to S10 are output in parallel from segment drive circuit 38. In this way, the rows of display elements in the upper region 38 of liquid crystal matrix display panel 26 are successively driven, with the rms value of the voltage applied across each display element being determined by the phase modulation provided by segment drive circuit 38.

Upon completion of addressing the fifth line of the display thereby ending the drive phase of that region, i.e. following timing signal pulse T5, timing electrodes and segment electrodes of upper region 28 of the display are connected to a fixed potential by switch means provided in timing drive circuit 32 and sec 38, thereby entering the rest phase of operation. In the waveform examples of FIG. 2, this fixed potential is the reference zero potential, about which the drive voltages alternate during the drive phase. The lower region 30, which was previously operating in the rest phase, now enters the drive phase, with timing signal pulse T6 being produced to address the sixth row of display elements. Thereafter the 7th to 10 rows of display elements are successively scanned, with phase-modulated segment drive signals S1' to S10' being output to drive these rows of display elements in the same way as described above for the upper region of the display panel. Upon completion of scanning lower region 30, i.e. upon completion of frame 1 shown in FIG. 2, lower region 30 again enters the rest phase, upper region 28 enters the drive phase, and the process described above is repeated.

From the above it can be understood that with the embodiment of FIG. 1, the rows of display elements of the liquid crystal matrix display panel are sequentially scanned at the same rate at which image data for each display element row is received as a television broadcast. In other words, there is no need to temporarily store large amounts of video data to be subsequently read out and applied to the display. This is a basic advantage of the present invention. As described hereinabove, such a liquid crystal matrix display panel, although having ten rows of picture elements, will provide a level of display contrast equivalent to that of a display panel having only five rows. Although the duty ratio of driving each display element is reduced by the duration of the rest phase interval, this can easily be counteracted by providing a sufficiently high level of drive voltage and does not present a problem in practice. It should be noted that this reduced duty ratio does not result in reduction of display contrast, since no cross-talk effects, acting to lower contrast, are generated across display elements which are operating in the rest phase.

For simplicity of description, the embodiment of FIG. 1 is shown as having only 10 rows of display elements. However it will be understood that a liquid crystal matrix display panel can be similarly provided in a television receiver which has for example 120 rows of display elements, but provides a level of display contrast which is substantially as high as that of a display panel having only 60 rows.

In the waveform example of FIG. 2, the rest phase is established by connecting both the timing electrodes and segment electrodes to a fixed common potential. This potential can comprise the negative or the positive potential of a battery serving as a power source, and such a method of producing the rest phase has the advantage that connection of the drive electrodes to this common potential can be accomplished by using a single conduction type of semiconductor switching element in accordance with the polarity of the common potential, e.g. P-channel or N-channel FETs. It is also possible to produce resting phase operation by utilizing switching elements to short-circuit the timing and segment electrodes of the region concerned.

Figure 3:
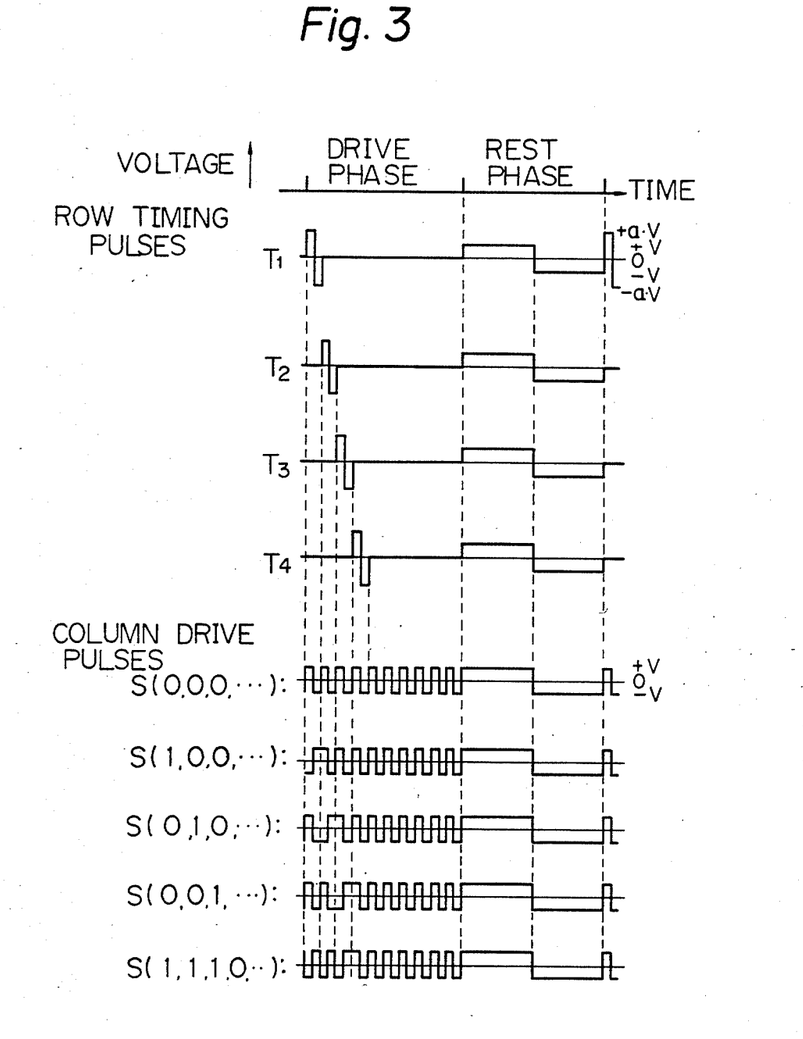
FIG. 3 and FIG. 4 are waveform diagrams for illustrating the method of display drive modulation used in the embodiment of FIG. 1 and methods of establishing rest phase operation.
Figure 4:
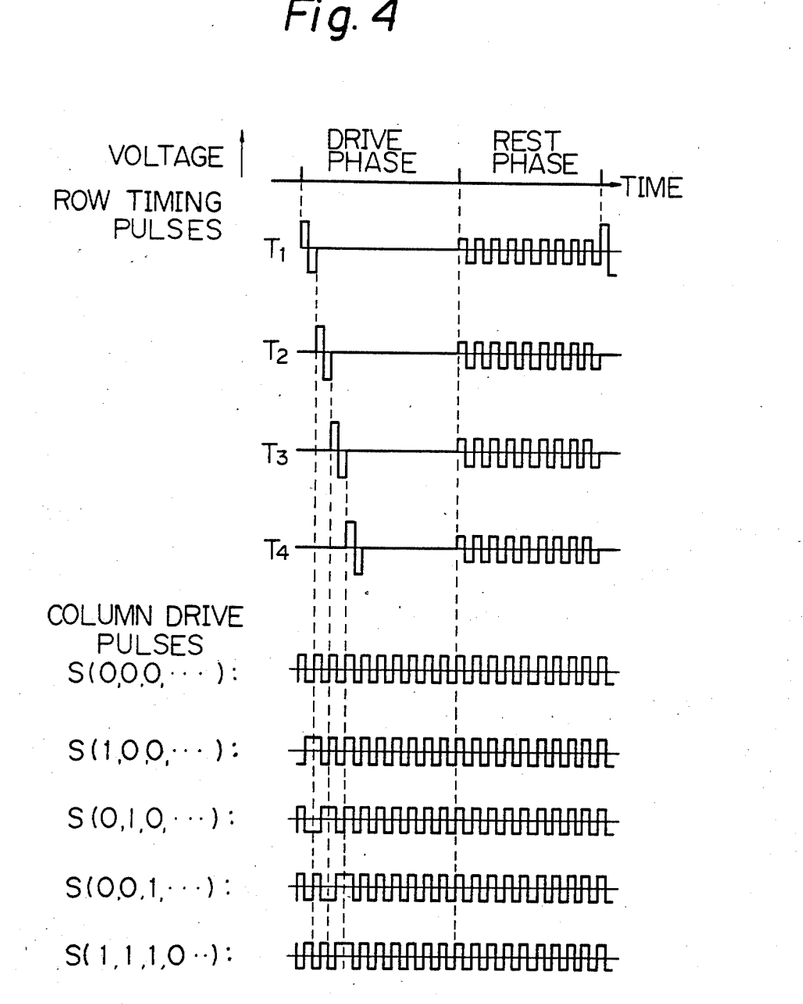

Another method of establishing the rest phase is illustrated in the timing chart of FIG. 3, which also serves to illustrate the method of phase modulation used in the embodiment of FIG. 1. In FIG. 3, during the rest phase, both the timing electrodes and the segment electrodes of the region of the display panel operating in the rest phase are connected to a separate source of an alternating rest phase potential. In the example of FIG. 3, this separately provided rest phase potential goes to a positive value +V during one-half of the rest phase, and to a negative value −V during the remaining half of the rest phase. FIG. 4 shows another example of a method of establishing the rest phase. In this case, an alternating bias voltage is held applied to the segment electrodes of the region operating in the rest phase, produced from the corresponding segment drive circuit, while the timing electrodes of that region are disconnected from the timing drive circuit and are connected to the segment electrodes of the region. In this way, although both the segment electrodes and timing electrodes are connected to an AC bias potential, a potential difference of zero is maintained across the display elements of the region operating in the rest phase.

The methods of FIG. 3 and FIG. 4 described above have the disadvantage that due to the fact that bipolar signal connections are established, it is necessary to use transmission gate circuit means to produce such connections, comprising both conduction types of semiconductor switching element, i.e. P-channel and N-channel FETs.

Referring again to FIG. 3, timing signal pulses and segment drive signals during the drive phase are illustrated, with the segment drive signal applied to one particular segment electrode being illustrated for five different data conditions, designated as S(0,0,0, ... ), S(1,0,0, ... ) ... S(1,1,1,0, ... ). For the first of these conditions, the segment drive signal is in phase with the timing signal pulses T1 to T4 during the drive phase, so that all of the display elements coupled to that segment electrode are held in the OFF state. For the second condition, the segment drive signal for the display element of that segment electrode which is in the first row, is phase shifted by 180°, so that a maximum duration of drive voltage, of amplitude (a.V+V) will be applied to this display element, which is thereby set in the fully ON state, i.e. the state of the display elements of that segment electrode can be designated as (1, 0, 0, ... ). In a similar way, for the third condition shown, the second display element in that column is set in the fully ON state, and so on. It will be apparent that intermediate degrees of element brightness can be obtained by suitably shifting the phase of the segment drive signals, to thereby vary the duty ratio for which voltage pulses of amplitude (a.V+V) are developed across a display element during the selection phase, i.e. during the timing signal pulse corresponding to that display element, to thereby control the rms value of voltage developed across the display element.

Such a phase modulation drive method has the advantage that the timing signal pulses and the segment drive signals each vary between two potentials, rather than between a larger number of potential levels such as is required by other modulation drive methods, so that the circuit configuration of the drive circuits can be simplified. Furthermore, in the embodiment of FIG. 1, the timing signal pulses have a higher peak value than that of the segment drive signals, e.g. a.V and V respectively in the waveform example of FIG. 3. This has the advantage that the timing drive circuit and the segment drive circuit can be designed separately in an optimum manner. That is to say, although the timing drive circuit must be capable of producing high-amplitude drive voltages, the circuit configuration can be relatively simple, since only signals of fixed period and pulse width are generated. The segment drive circuit on the other hand, although of rather more complex circuit configuration due to the need for performing phase modulation of the drive signals produced, need only generate relatively low-amplitude output signals. In this way, drive circuit design can be optimized, since it is not necessary to provide circuits which are both complex and must utilize elements having a high voltage-withstanding capability, so that the cost of the integrated circuits used for the drive circuits can be reduced, by comparison with other methods of modulation.

In the embodiment of FIG. 1, the liquid crystal matrix display panel is divided into two regions, for rest phase drive purposes. However it is equally possible to divide the display panel into a greater number of regions. The use of an upper and a lower region as in the example of FIG. 1 has the advantage that the lead-out of connecting leads for the segment electrodes of the upper and lower halves of the display panel can be easily arranged. That is to say, the connecting leads (for connecting to segment drive circuit 38 in FIG. 1) of the top half can be brought out from the upper edge of the display panel, while those for the lower half can be brought out from the lower edge of the display panel.

It should be further noted that with the display panel divided into a greater number of regions than 2, these regions can be shaped and mutually arranged in a variety of ways, i.e. can be of narrow elongated shape, for example, aligned in the horizontal or vertical direction.

Figure 5:
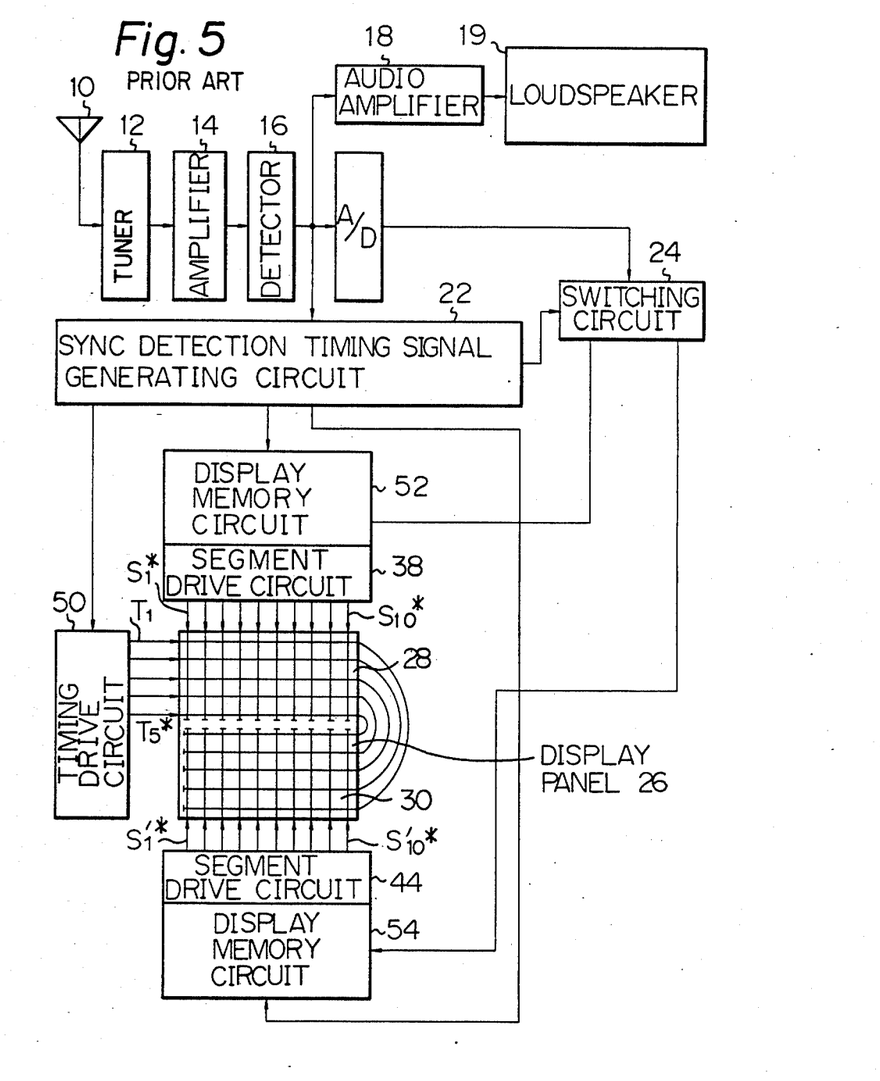
FIG. 5 is a general block circuit diagram of an embodiment of a television receiver incorporating a liquid crystal matrix display panel according to the prior art, in which the display panel is divided into separate regions provided with image memory circuits.

Referring now to FIG. 5, an example of a prior art type of television receiver provided with a liquid crystal matrix display panel is shown in general block circuit diagram form. For ease of comparison of the matrix drive method used in this example with the embodiment according to the present invention of FIG. 1, a display panel having the same number of display elements as that of FIG. 1 is shown. Circuit blocks having identical functions to those of the embodiment of FIG. 1 are indicated by identical reference numerals in FIG. 5, and will not be described further. In this example, as in the embodiment of FIG. 1, the liquid crystal matrix display panel 26 is divided into an upper region 28 and a lower region 30. However pairs of timing electrodes in the upper region and lower region are connected in common as shown, i.e. the timing electrode for the first row of display elements is connected in common with the timing electrode of the 10th row of display elements, the timing electrode of the second row of display elements is connected to the timing electrode of the 9th row of display elements, and so on. In this way, only a set of five timing signal pulses are produced from timing drive circuit 50, designated as T1* to T5* respectively. Numeral 52 denotes a first image memory circuit, for storing image data corresponding to the upper region 28 of display panel 26, while numeral 54 denotes a second image memory circuit for storing image data corresponding to the lower region 30 of display panel 26. Although not indicated in FIG. 5, each of these memory circuits includes circuit means for assembling the point-by-point encoded image data transferred through switching circuit 24 from A-D converter circuit 20 into line-by-line form, as described for the embodiment of FIG. 1 above.

Figure 6:
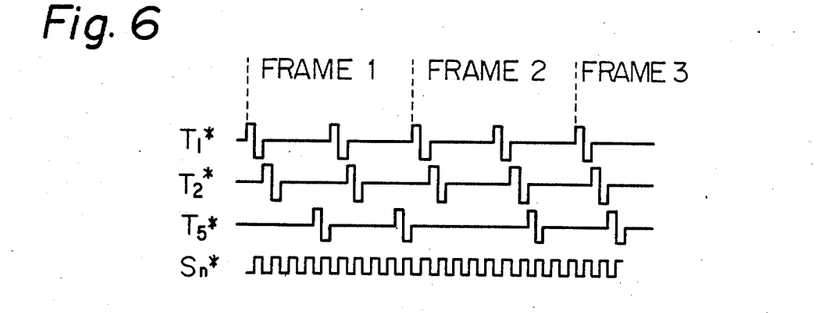
FIG. 6 is a timing chart for illustrating the operation of the example of FIG. 5.

The operation of this example will be described with reference to the timing chart of FIG. 6. Firstly, the image data for the upper region 28 of the display is transferred successively by switching circuit 24 into first display memory circuit 52, and stored therein, as it is received by the television receiver. The image data for the lower region 30 of the display is then transferred by switching circuit 24 into second display memory circuit 54, and stored therein. Thereafter, a first timing signal pulse T1* is output from timing drive circuit 50, and selects the first and tenth rows of display elements of display panel 26, while at the same time video data in the form of modulated (e.g. phase-modulated) segment drive signals S1* to S10*, derived from the image data stored in memory circuit 52, is output from segment drive circuit 38 in parallel onto the segment electrodes of the upper region 28 while at the same time image data for the tenth row of display elements is output from segment drive circuit 44, derived from the contents of memory circuit 54, as segment drive signals S1'* to S10'*. In this way, the first and tenth rows of display elements are driven at the same time. The second and ninth rows of display elements are than similarly selected by timing pulse T2*, and so on until the fifth and sixth rows have been selected by pulse T5*. This scanning process is then repeated during the second half of the frame interval.

This drive method can achieve a similar improvement in display contrast to that of the present invention, since only one region of the display panel is driven at a time. However it has the disadvantage of requiring a large-capacity video memory circuit, capable of high-speed operation, which cannot be provided economically in practice. For example, if each row of picture elements comprises 300 elements, and assuming that 3 data bits are required to represent the density variations of each display element, then the line memory circuit required for a single row of display elements is 900 bits. Assuming that the display comprises 120 rows of display elements, then a total of 198 kilobytes of display memory circuit capacity will be required. Even if the display memory capacity is only made sufficient to store one-half of the complete display data, at least 100 kilobytes will be required. In the case of a color television receiver, the required memory capacity will be greatly increased.

Figure 7:
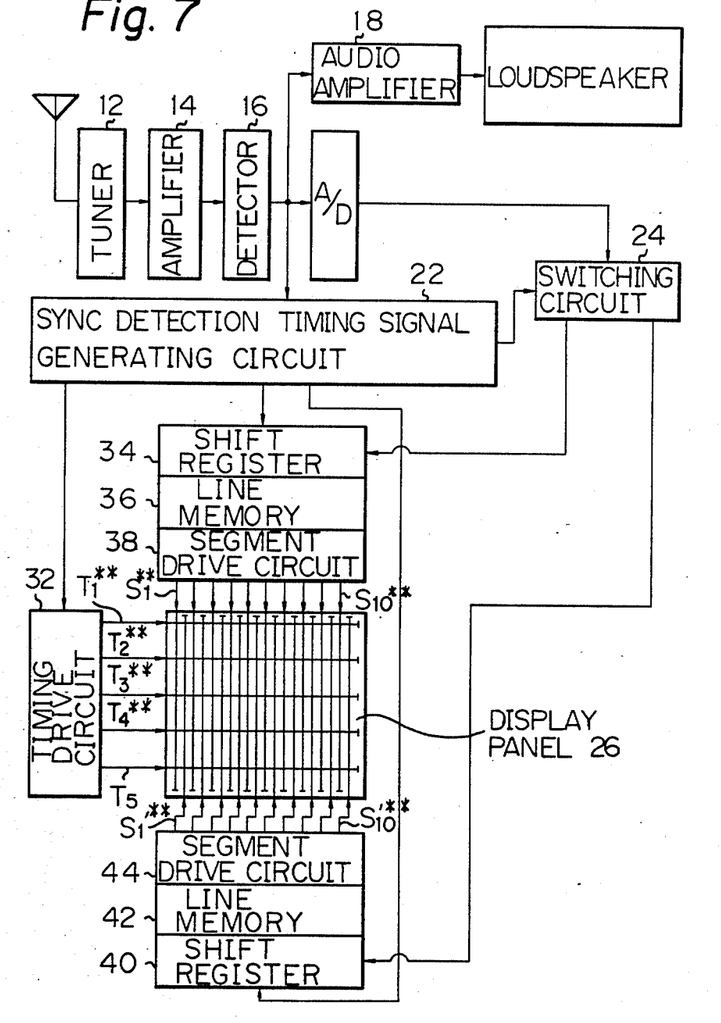
FIG. 7 is a general block circuit diagram of an embodiment of a television receiver incorporating a liquid crystal matrix display panel according to the prior art, in which multiplex driving of the display electrodes is performed.

Referring now to FIG. 7, another prior art drive method for a liquid crystal matrix display panel is illustrated, in similar general block circuit diagram form to the examples of FIG. 1 and FIG. 5. In the example of FIG. 7, duplex operation of the timing electrodes is utilized, that is to say each timing electrode serves to drive a plurality of rows of display elements (in this example, two rows). As in the embodiment of the present invention in FIG. 1 and the prior art example of FIG. 5, the liquid crystal matrix display panel in the example of FIG. 7 provides a total of 100 display elements.

Figure 8:
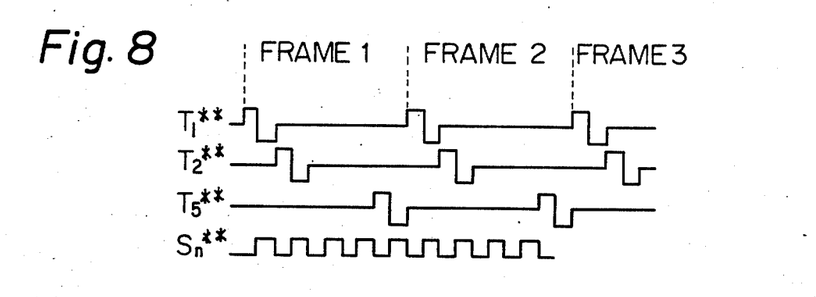
FIG. 8 is a timing chart for illustrating the operation of the embodiment of FIG. 7.

The operation of the multiplex drive example of FIG. 7 can be understood from the timing chart of FIG. 8. In this case, the period of each of the timing signal pulses T1 to T5 is identical to the period used in the embodiment of FIG. 1, but each timing signal pulse has twice the pulse width of the timing signal pulses used in the preceding examples, so that each timing signal pulse serves to drive two sets of display elements. For example, during timing signal pulse T1, the phase-modulated segment drive signals S1 to S10 for the first row of display elements would be output from segment drive circuit 38, then segment drive signals S1' to S10'** would be output from circuit 44. In an actual display panel, the second row of display elements, formed at the intersections of the segment electrodes driven by segment drive circuit 44 with the first timing electrode would be positioned immediately below the first row of display elements, formed at the intersections of the first timing electrode with the segment electrodes which are driven by segment drive circuit 38. That is to say, a simple linear arrangement of the drive electrodes such as is used in the embodiment of FIG. 1 and the example of FIG. 5 is not practical when multiplex drive is utilized.

Due to the multiplex drive used in the example of FIG. 7, the same level of display contrast is obtained as for the embodiment of FIG. 1 and the example of FIG. 5, i.e. substantially identical to that which can be obtained with a liquid crystal matrix display panel having only one-half the number of rows of display elements. With the arrangement of electrodes used in the example of FIG. 7, one set of ten connecting leads to the segment electrodes is brought out from the lower part of the display panel to the segment drive circuit 44, while the connecting leads for the other set of ten segment electrodes is brought out from the upper part of the display panel to the corresponding segment drive circuit 38. In this way, cross-overs between the segment electrodes or the connecting leads between the segment electrodes and circuits 38 and 44 are avoided. However it will be apparent that if multiplexing by a factor higher than 2 is utilized, then it will become necessary to use such cross-overs, and in addition the patterning arrangement of the drive electrodes on the display panel itself will become extremely complex, with the necessity for providing electrode connecting portions on the display panel. Such connecting portions will reduce the display area available for the display elements themselves, i.e. will reduce the aperture ratio of the display, while the use of cross-overs will result in an increased level of cross-talk being produced between the electrodes. Both of these factors will result in a lowering of display contrast, thereby acting against the objective of employing display multiplexing.

However, if such a drive multiplexing arrangement is combined with the drive methdd of the present invention, then these disadvantages can be eliminated. Specifically, liquid crystal matrix display panel could be divided into two regions, with respect to the rest phase drive method of the present invention, each region having 64 rows of display elements, with multiplexing of the timing electrode drive signals as in the example of FIG. 7 being applied to the upper half and the lower half of the display. In this way, it would be possible to provide a television receiver having a display comprising an array of 512×760 picture elements, for example.

From the above it will be apparent that a television receiver provided with a liquid crystal matrix display panel according to the present invention, particularly when the rest phase method of the present invention is combined with the use of multiplexed drive of the display electrodes, can enable practical attainment of a much greater display element density on the display panel together with a satisfactory level of display contrast than has been possible in the prior art, without the necessity to utilize expensive large-capacity image memory circuit means, or to utilize complex and inefficient electrode patterning arrangements.

Figure 9A:
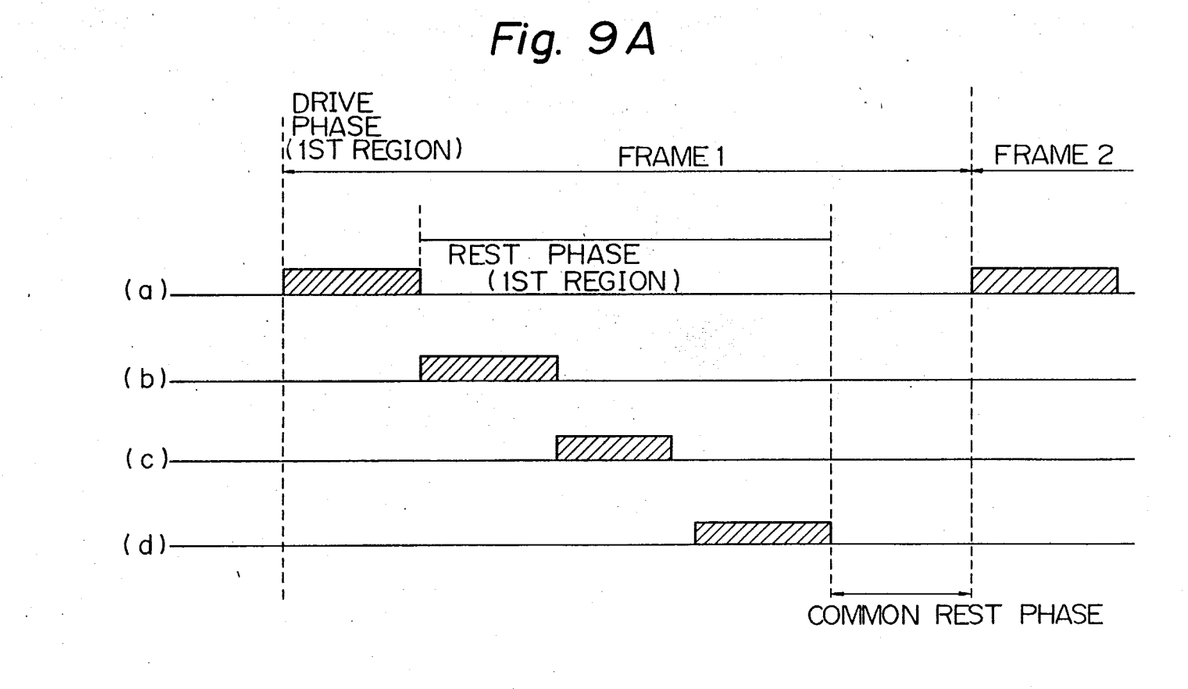
FIG. 9A and 9B are timing charts for illustrating common rest phase operation.

The drive method used in the present invention can be modified in various ways. For example, a television broadcast signal includes a vertical blanking portion, containing no video information, during which vertical flyback of the trace in a CRT display television receiver takes place. In the case of a liquid crystal matrix display television receiver according to the present invention, it is possible to reduce power consumption by arranging to connect all of the timing and segment drive electrodes to a common potential during this flyback interval, or to otherwise arrange that the display operates in the resting phase mode of operation described hereinabove. This is illustrated in FIG. 9A for the case of a display made up of four regions. As indicated in FIG. 9A(a), a first region enters the drive phase at the start of each frame, with the other regions in the rest phase. A second region then enters the drive phase, and the first region enters the rest phase. Finally, as shown in FIG. 9A(d), the fourth region terminate the drive phase, whereupon all of the regions enter a rest phase operating state for the duration of the vertical blanking interval.

Figure 9B:
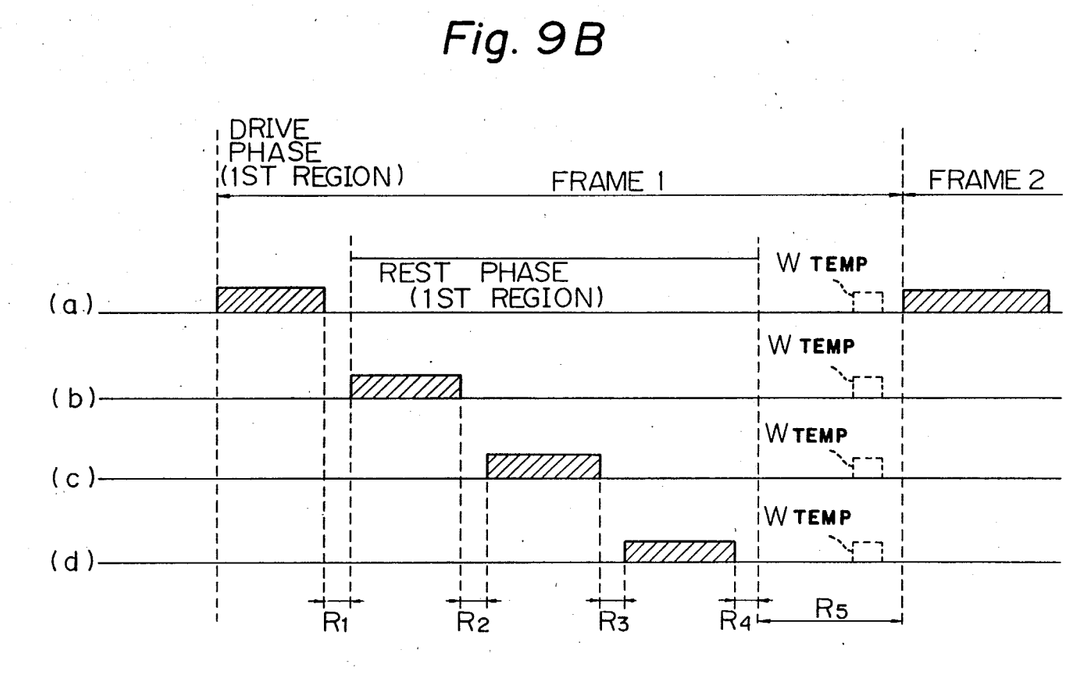

Another method of establishing a common rest phase is illustrated in FIG. 9B. In this case, a common rest phase is entered upon the termination of each drive phase. That is to say, as illustrated in FIG. 9B(a), a common rest phase is entered, designated as $R_1$ upon completion of the drive phase of a first region, a common rest phase $R_2$ upon completion of the drive phase of the second region, and so on.

The threshold voltage of a liquid crystal display element varies with temperature, i.e. decreases as the ambient operating temperature rises. Thus, in order to maintain a constant display brightness level against changes in temperature, compensation can be applied by increasing the relative proportion of each common rest phase interval $R_1, \ldots$ shown in FIG. 9B in accordance with increases in operating temperature. This will have the effect of reducing the effective r.m.s. voltage applied to the display elements, thereby compensating for the effects of temperature.

Alternatively, such temperature compensation can be provided by implementing a common bias phase during each of the vertical blanking intervals, i.e. by applying an AC bias voltage across each display element for a predetermined duration during each vertical blanking interval. Temperature compensation can then be performed by varying the duration of the common bias phase or the amplitude of the bias voltage, to thereby vary the r.m.s. voltage applied to the display elements. Such common bias phase intervals are indicated by the broken-line outline portions $W_{TEMP}$ in FIG. 9B during a vertical blanking interval $R_5$.

In the above description, it has been assumed that the regions into which the display is divided comprise separate portions of the display. However it is equally possible to form the regions with portions thereof arranged in a mutually intermingling manner. For example, it can be arranged that one region comprises a set of even-numbered rows of display elements, and another comprises a set of odd-numbered elements. Such an arrangement is highly suitable for the case of an interlaced TV signal such as an NTSC video signal. Taking as an example the embodiment of FIG. 1, this could be made to comprise 4 regions. That is, during one field, the even-numbered rows of elements of the upper half 28 of panel 26 could be successively addressed by the timing and segment drive signals, that set of rows constituting a first region, then the even-numbered rows of the lower half 30 would be successively addressed, to complete that field. The next field would then be interlaced with the first by successively addressing the odd-numbered rows in the upper half 28 of the display, then the odd-numbered rows in the lower half 30 of the display. In this way, the sets of even and odd-numbered rows in the upper and lower halves of the display effectively constitute four display regions, for the purposes of the present invention. It will be apparent that such an arrangement will enable the display to be driven by an interlace video signal without the necessity for video memory means.

Another possible arrangement of regions would be to arrange each row of display elements as a plurality of identical sets of elements. One region could then for example comprise the first set in the first row, the second set in the second row, and so on. Another region could comprise the second set in the first row the third set in the second row, and so on. In this way, each region could comprise a plurality of sets of display elements arranged in a "mosaic" manner.

Figure 10:
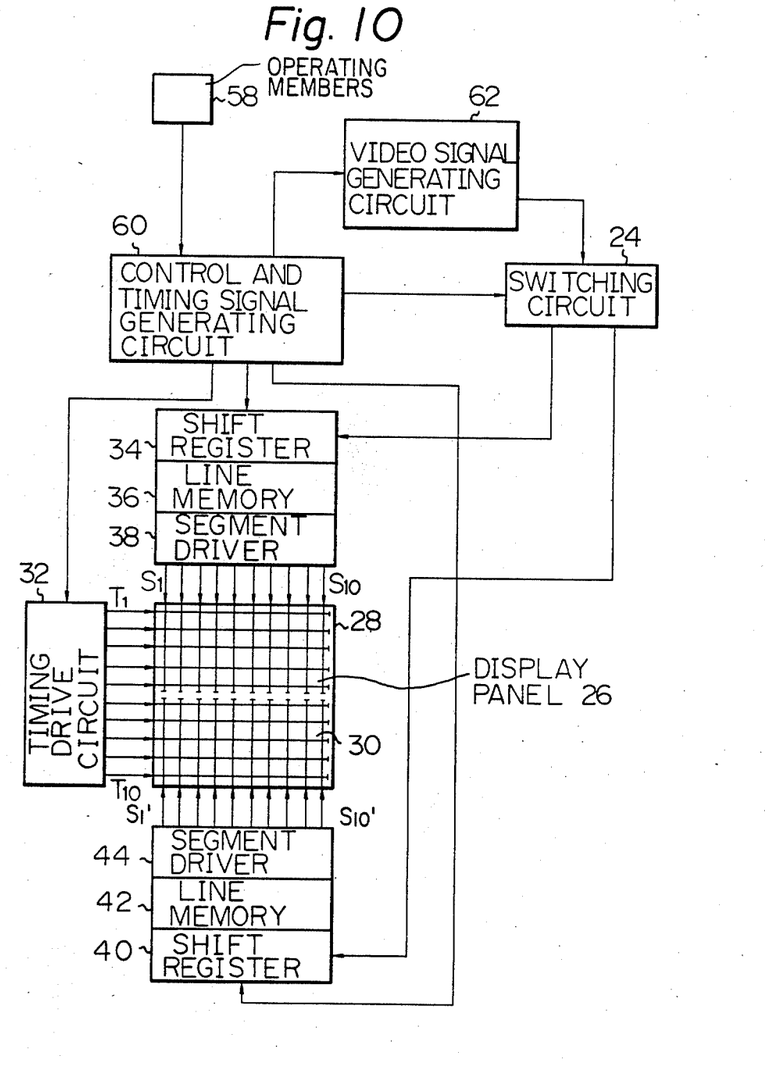
FIG. 10 is a general block diagram of an electronic device incorporating a display panel according to the present invention.

It should be noted that the resting phase concept of the present invention is not limited to television receiver applications, but is generally applicable to various electronic devices which incorporate liquid crystal display panels, such as video games, etc, and that in addition the concept of utilizing a common resting phase interval is also applicable to such other electronic devices. FIG. 10 is a simple block circuit diagram of such an electronic device, in which a control and timing signal generating circuit 60 produces various timing signals in response to inputs from external operating members 58, to thereby control the output of video signal data from a video signal generating circuit 62. As in the first embodiment of FIG. 1, the matrix display panel 26 is divided into two regions, i.e. upper and lower halves 28 and 30.

It should be further noted that although in the described embodiment the regions into which the display matrix is divided with respect to rest phase drive is determined in accordance with the requirements of sequential row-by-row scanning of the display, various other arrangements and shapes of such regions can be utilized, for example to simplify connection leads between the drive electrodes of the display panel and the drive circuits.

Although the present invention has been described in the above with reference to specific embodiments, it should be noted that various changes and modifications to the embodiments may be ments may be envisaged, which fall within the scope claimed for the invention as set out in the appended claims. The above specification should therefore be interpreted in a descriptive and not in a limiting sense.

What is claimed is:

1. A television receiver, comprising:
   circuit means for deriving television video signals and timing control signals from a broadcast television signal;
   a liquid crystal matrix display panel formed with mutually opposed drive electrodes, with a matrix array of liquid crystal display elements being formed at respective intersections of said drive electrodes;
   segment and timing electrode drive circuit means for generating, from said video signals and timing control signals, segment drive signals and timing drive signals to be applied to said drive electrodes;
   said liquid crystal matrix display panel being divided into a plurality of regions each comprising a set of liquid crystal display elements driven by a specific set of said drive electrodes independently of the drive electrodes of the other ones of said regions, with the drive electrodes of each of said regions being electrically isolated from the drive electrodes of all other ones of said regions;
   said drive means being controlled by said timing control signals for successively setting each of said regions in a drive phase operating status in which said segment and timing drive signals are applied to said drive electrodes of that region, and a rest phase operating status in which the potential applied between said drive electrodes of said display elements of said region is maintained substantially equal to zero, with said regions successively entering said rest phase and drive phase in a time-sharing manner;

in which each of said sets of drive electrodes comprises a set of timing electrodes to which said timing electrode drive circuit means applies said timing drive signals, which are generated periodically as fixed function of time, for sequentially selecting lines of display elements of said liquid crystal matrix display panel, and which alternate between predetermined first and second potential levels, and a set of segment electrodes disposed opposing said timing electrodes, to which said segment electrode drive circuit means applies said segment drive signals, which are subjected to phase modulation in accordance with said video data signals and which alternate between predetermined third and fourth potential levels.

2. A television receiver according to claim 1, and further comprising switching elements controlled by said segment electrode and timing electrode drive circuit means for establishing said rest phase, whereby the timing electrodes of a region operating in said rest phase are connected to the segment electrodes of that region so that said timing electrodes and segment electrodes both alternate between said third and fourth potential levels.

3. A television receiver according to claim 1, and further comprising switching elements controlled by said segment electrode and timing electrode drive circuit means for establishing said rest phase, whereby the timing electrodes and segment electrodes of a region operating in said rest phase are connected to a common fixed potential.

4. A television receiver according to claim 1, and further comprising switching elements controlled by said segment electrode and timing electrode drive circuit means for establishing said rest phase, whereby the timing electrodes and segment electrodes of a region operating in said rest phase are connected to a common periodically varying potential.

5. A television receiver according to claim 1, and further comprising switching elements controlled by said segment electrode and timing electrode drive circuit means for establishing said rest phase, whereby a short-circuit condition is established between the timing electrodes and segment electrodes of the display elements of a region operating in said rest phase.

6. A television receiver according to claim 1, in which the peak amplitude of said timing drive signals is substantially higher than that of said segment drive signals.

7. A television receiver according to claim 1, in which said liquid crystal matrix display panel is divided into two of said regions, with a first region comprising the upper half of said display panel and a second region comprising the lower half of said display panel.

8. A television receiver according to claim 2, in which said segment electrode and timing electrode drive circuit means perform multiplex drive of the timing electrodes of each of said regions, whereby during said drive phase of a region, each timing electrode of that region successively drives each of a plurality of rows of said display elements, by time-sharing operation of said timing drive signals and segment drive signals.

9. A television receiver according to claim 1, in which said regions each comprise a plurality of rows of said display elements, with the rows of display elements of each region being sequentially driven in successive line-by-line manner during said drive phase in accordance with said video data.

10. A television receiver, comprising:
circuit means for deriving television video signals and timing control signals from a broadcast television signal;
a liquid crystal matrix display panel formed with mutually opposed drive electrodes, with a matrix array of liquid crystal display elements being formed at respective intersections of said drive electrodes;
segment and timing electrode drive circuit means for generating, from said video signals and timing control signals, segment drive signals and timing drive signals to be applied to said drive electrodes;
said liquid crystal matrix display panel being divided into a plurality of regions each comprising a set of liquid crystal display elements driven by a specific set of said drive electrodes independently of the drive electrodes of the other ones of said regions, with the drive electrodes of each of said regions being electrically isolated from the drive electrodes of all other ones of said regions;
said drive means being controlled by said timing control signals for successively setting each of said regions in a drive phase operating status in which said segment and timing drive signals are applied to said drive electrodes of that region, and a rest phase operating status in which the potential applied between said drive electrode of said display elements of said region is maintained substantially equal to zero, with said regions successively entering said rest phase and drive phase in a time-sharing manner;
in which said liquid crystal matrix display panel periodically operates in a common rest phase, in which all of said display elements are set in said rest phase status.

11. A television receiver according to claim 10, in which the relative durations of a drive phase and a common rest phaes for each of said regions is caried such as to compensate for the effects of temperature changes upon the operation of said liquid crystal display elements.

12. A television receiver, comprising:
circuit means for deriving television video signals and timing control signals from a broadcast television signal;
a liquid crystal matrix display panel formed with mutually opposed drive electrodes, with a matrix array of liquid crystal display elements being formed at respective intersections of said drive electrodes;
segment and timing electrode drive circuit means for generating, from said video signals and timing control signals, segment drive signals and timing drive siganls to be applied to said drive electrodes;
said liquid crystal matrix display panel being divided into a plurality of regions each comprising a set of liquid crystal display elements driven by a specific set of said drive electrodes independently of the drive electrodes of the other ones of said regions, with the drive electrodes of each of said regions being electrically isolated from the drive electrodes of all other ones of said regions;

said drive means being controlled by said timing control signals for successively setting each of said regions in a drive phase operating status in which said segment and timing drive signals are applied to said drive electrodes of that region, and a rest phase operating status in which the potential applied between said drive electrodes of said display elements of said region is maintained substantially equal to zero, with said regions successively entering said rest phase and drive phase in a time-sharing manner;

in which said liquid crystal matrix display panel periodically operates in a common bias phase, in which a bias voltage is applied across all of said display elements during a predetermined time interval.

13. A television receiver according to claim 12, in which the duration of said common bias phase interval is varied such as to compensate for the effects of temperature changes upon the operation of said liquid crystal display elements.

14. An electronic display apparatus, comprising:
circuit means for generating video signals and timing control signals;
segment electrode and timing electrode drive circuit means for respectively generating segment electrode and timing electrode drive signals in response to said video and timing control signals, and;
a liquid crystal matrix display panel comprising mutually opposed pluralities of segment electrodes and timing electrodes with a matrix array of liquid crystal display elements being formed at intersections of said opposing segment electrodes and timing electrodes;
said liquid crystal matrix display panel being divided into a plurality of regions each comprising a set of liquid crystal display element driven by a specific set of said segment electrodes and a specific set of said timing electrodes, indpendently of the segment electrodes and timing electrodes of the other ones of said regions, said segment electrode and timing electrode drive circuit means acting to successively set each of said regions in a drive phase operating status in which segment electrode and timing electrode drive signals are applied to the display elements of that region in accordance with said video data and said timing control signals respectively, and a rest phase operating status in which a potential substantially close to zero is maintained between the opposing timing electrodes and and segment electrodes of the display elements in that region, said regions successively entering said rest phase and drive phase in a time-sharing manner, and said liquid crystal matrix display panel periodically operating in a common rest phase in which all of said display elements are set in said rest phase status.

15. A television receiver, comprising:
circuit means for deriving television video signals and timing control signals from a broadcast television signal;
a liquid crystal matrix display panel formed with drive electrodes comprising a plurality of segment electrodes and a plurality of timing electrodes, respectively mutually opposed, with a matrix array of liquid crystal display elements being formed thereby at respective intersections of said segment and timing electrodes;
drive circuit means for generating, from said video signals and timing control signals, segment drive signals and timing drive signals to be applied to said segment electrodes and timing electrodes respectively;
said liquid crystal matrix display panel being divided into a plurality of regions each comprising a set of liquid crystal display elements driven by a specific set of said drive electrodes independently of the drive electrodes of the other ones of said regions, with the drive electrodes of each of said regions being electrically isolated from the drive electrodes of all other ones of said regions;
said drive means being controlled by said timing control signals for successively setting each of said regions in a drive phase operating status in which said segment and timing drive signals are applied to said segment and timing electrodes of that region, and a rest phase operating status in which the potential applied between the segment electrodes and timing electrodes of said display elements of said region is maintained substantially equal to zero, with said regions successively entering said rest phase and drive phase in a time-sharing manner.

16. A television receiver according to claim 15, and further comprising switching elements controlled by said drive circuit means for establishing said rest phase, whereby the timing electrodes and segment electrodes of a region operating in said rest phase are connected to a common fixed potential.

17. A television receiver according to claim 15, and further comprising switching elements controlled by said segment electrode and timing electrode drive circuit means for establishing said rest phase, whereby the timing electrodes and segment electrodes of a region operating in said rest phase are connected to a common periodically varying potential.

18. A television receiver according to claim 15, and further comprising switching elements controlled by said segment electrode and timing electrode drive circuit means for establishing said rest phase, whereby a short-circuit condition is established between the timing electrodes and segment electrodes of a region operating in said rest phase.

19. A television receiver according to claim 15, in which the peak amplitude of said timing drive signals is substantially higher than that of said segment drive signals.

20. A television receiver according to claim 15, in which said liquid crystal matrix display panel is divided into two regions, with a first region comprising the upper half of said display panel and a second region comprising the lower half of said display panel.

21. A television receiver according to claim 15, in which said segment electrode and timing electrode drive circuit means perform multiplex drive of the timing electrodes of each of said regions, whereby during said drive phase of a region, each timing electrode of that region successively drives each of a plurality of rows of said display elements, by time-sharing operation of said timing drive signals and segment drive signals.

22. A television receiver according to claim 15, in which said regions each comprise a plurality of rows of said display elements, with the rows of display elements of each region being sequentially driven in successive line-by-line manner during said drive phase in accordance with said video data.

* * * * *